US00RE47667E

(19) United States
(12) Reissued Patent
De Sousa et al.

(10) Patent Number: US RE47,667 E
(45) Date of Reissued Patent: Oct. 29, 2019

(54) GARMENT AND BRASSIERE ACCESSORY

(71) Applicants: Michelle E. De Sousa, Naples, FL (US); Jose De Jesus De Sousa, Naples, FL (US)

(72) Inventors: Michelle E. De Sousa, Naples, FL (US); Jose De Jesus De Sousa, Naples, FL (US)

(21) Appl. No.: 14/248,869

(22) Filed: Apr. 9, 2014

Related U.S. Patent Documents

Reissue of:
(64) Patent No.: 8,152,591
Issued: Apr. 10, 2012
Appl. No.: 13/095,124
Filed: Apr. 27, 2011

U.S. Applications:
(63) Continuation of application No. 12/778,212, filed on May 12, 2010, now Pat. No. 8,257,139, which is a
(Continued)

(51) Int. Cl.
*A41C 3/00* (2006.01)
*A41C 3/08* (2006.01)
(Continued)

(52) U.S. Cl.
CPC ..... *A41C 3/08* (2013.01); *A41B 9/06* (2013.01); *A41D 27/08* (2013.01)

(58) Field of Classification Search
CPC .... A41C 3/08; A41C 3/00; A41B 9/06; A41B 9/08; A41D 27/08; A41D 27/12
USPC ..... 450/1, 30–35, 63, 70–74, 77–80, 82, 86, 450/88, 87, 92, 93; 2/912, 913, 69, 2/73–75, 90, 96, 102–106, 109, 110, 113,
(Continued)

(56) References Cited

U.S. PATENT DOCUMENTS 58,673 A 10/1866 Pinner
147,264 A 2/1874 Hodgkins
(Continued)

FOREIGN PATENT DOCUMENTS

JP 2008-156783 10/2008
KR 1998-059442 10/1998
(Continued)

OTHER PUBLICATIONS

Cover of SkyMall Catalog; Holiday 2013; www.SkyMall.com; 2 pgs.

*Primary Examiner* — Patricia L Engle

(57) ABSTRACT

A garment and brassiere accessory that is substantially triangular in shape having attachment straps extending outward from upper corners of the undergarment that may be looped around shoulder straps of a brassiere. In addition, a lower corner may be looped around a center portion of the brassiere. An upper band of preferably elastomeric material located along an upper edge of the undergarment keeps the undergarment securely against a woman's chest while being worn. The undergarment is preferably constructed from two layers of material, an outer layer and an inner layer so that the outer layer hides any wrinkles or indentations caused by the stress of the lower corner pulling on the inner layer while the undergarment is being worn. Additional features include extension straps that allow a user to adapt the undergarment to a larger chest and/or brassiere size or to wear the undergarment without a brassiere and detachable jewelry.

17 Claims, 4 Drawing Sheets

Related U.S. Application Data continuation-in-part of application No. 12/586,622, filed on Sep. 25, 2009, now Pat. No. 8,062,093, which is a continuation-in-part of application No. 11/855,131, filed on Sep. 13, 2007, now abandoned.

(51) Int. Cl.
*A41B 9/06* (2006.01)
*A41D 27/08* (2006.01)

(58) Field of Classification Search
USPC ..... 2/114, 118, 67, 119, 122, 129, 133, 46, 2/50–54
See application file for complete search history.

(56) References Cited

U.S. PATENT DOCUMENTS 188,015 A 3/1877 Holmes
239,295 A 3/1881 Bortree
D27,810 S 11/1897 Guinzburg
614,650 A 11/1898 Fooks
626,589 A * 6/1899 Bucher ..... 450/28
671,269 A 4/1901 Dufour
731,759 A * 6/1903 Dieter ..... 2/48
770,752 A * 9/1904 Hull ..... 2/54
1,344,004 A 6/1920 Platt
1,395,564 A * 11/1921 Enriquez ..... A41D 27/18 2/101
1,406,225 A * 2/1922 Rathsmill ..... A41B 9/12 2/211
1,645,995 A * 10/1927 McCarthy ..... 2/92
1,661,350 A 3/1928 Schmutzler
1,683,545 A * 9/1928 Harris ..... 63/1.15
1,749,333 A 3/1930 Fridolph
2,268,781 A * 1/1942 Slotoroff ..... A41D 7/00 450/32
2,278,332 A 9/1942 Rasch
2,385,877 A 10/1945 Morgan
2,468,841 A * 5/1949 Siegel ..... A41D 13/0518 2/463
2,472,606 A * 6/1949 Michaelson ..... 450/86
2,543,361 A 2/1951 Garner
2,661,471 A 12/1953 Neumayer
2,707,786 A * 5/1955 Stoner ..... 2/119
3,064,265 A * 11/1962 Bridgewaters ..... 2/74
3,323,139 A 6/1967 Champagne et al.
4,449,252 A * 5/1984 Sullinger ..... A41D 13/0015 2/46
D277,808 S 3/1985 Nichols
4,837,859 A * 6/1989 Hamberg ..... A41D 13/0537 2/1
4,955,846 A 9/1990 Greenberg
4,995,846 A * 2/1991 Mariol ..... 446/376
5,208,917 A * 5/1993 Acenbrack ..... A41D 23/00 2/113
5,447,462 A 9/1995 Smith et al.
5,807,160 A 9/1998 Wehmeyer
5,832,535 A 11/1998 Davis
D425,823 S * 5/2000 Farfan ..... D11/213
6,058,507 A 5/2000 Klimenko
D426,790 S * 6/2000 Farfan ..... D11/213
6,205,585 B1 * 3/2001 Capparelli ..... 2/106
6,282,720 B1 9/2001 Mayer
6,345,396 B1 * 2/2002 Schuler ..... A41D 13/0537 2/465
6,550,067 B2 * 4/2003 Force ..... 2/104
6,935,921 B1 * 8/2005 Eudenbach et al. ..... 450/54
D553,827 S * 10/2007 Mehes ..... D2/717
7,409,728 B2 8/2008 Harry
7,520,794 B1 * 4/2009 Johnson ..... 450/1
7,780,502 B2 8/2010 Calamari et al.
8,096,851 B2 1/2012 Fine
8,221,186 B2 7/2012 Policaro et al.
2004/0007018 A1 * 1/2004 Detsis ..... A41C 3/00 63/21
2005/0150030 A1 * 7/2005 Davis ..... A41D 13/0537 2/69
2006/0277648 A1 * 12/2006 Harry ..... 2/69
2007/0281585 A1 * 12/2007 Calamari et al. ..... 450/1
2009/0069766 A1 3/2009 Bannister
2009/0093189 A1 4/2009 Frey
2009/0217439 A1 9/2009 Ross
2010/0107302 A1 * 5/2010 Ross ..... 2/113
2010/0178846 A1 7/2010 Brooker
2010/0203803 A1 7/2010 Murphy et al.
2010/0223713 A1 9/2010 De Sousa et al.
2011/0265240 A1 11/2011 Frey
2012/0144552 A1 * 6/2012 Ross ..... 2/113
2012/0220191 A1 8/2012 Murphy et al.

FOREIGN PATENT DOCUMENTS

KR 20-0297748 11/2002
KR 20-0382325 4/2005
KR 20-0442771 12/2008
KR 10-2009-0012902 2/2009
WO 2000/01258 A2 1/2000
WO 2008/109939 A1 9/2008
WO WO 2009125939 A3 * 10/2009

* cited by examiner

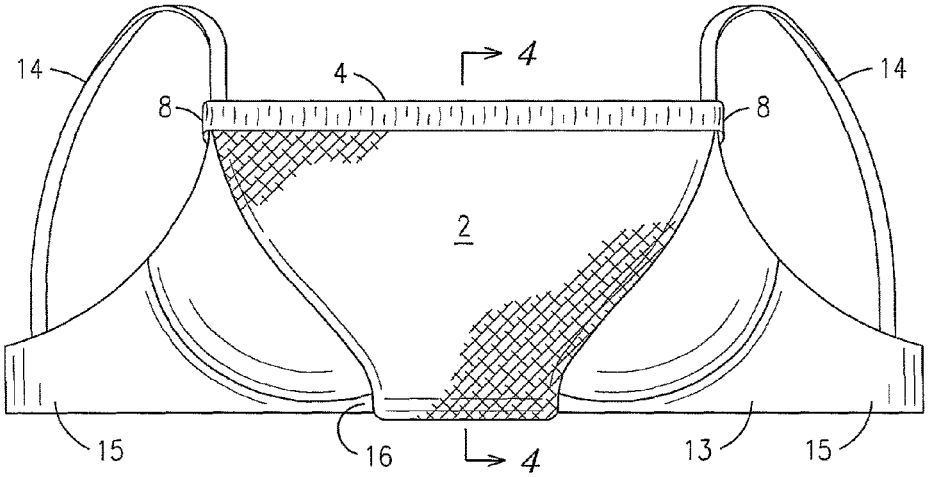
FIG. 3
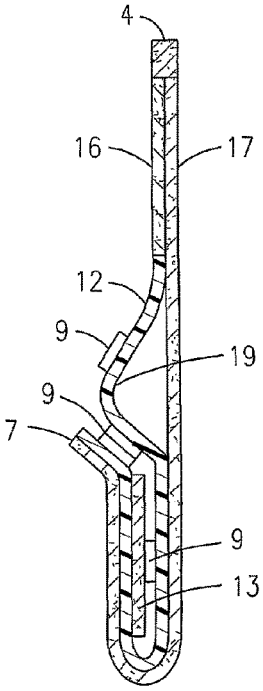
FIG. 4
FIG. 7
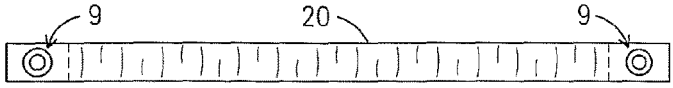

GARMENT AND BRASSIERE ACCESSORY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATION

This is *a reissue application of U.S. Pat. No. 8,152,591, issued on Apr. 10, 2012, based on U.S. patent application Ser. No. 13/095,124, filed on Apr. 27, 2011, which was* a continuation application of U.S. patent application Ser. No. 12/778,212, filed on May 12, 2010, *now U.S. Pat. No. 8,257,139,* which was a continuation-in-part application of U.S. patent application Ser. No. 12/586,622, filed on Sep. 25, 2009, *now U.S. Pat. No. 8,062,093,* which was a continuation-in-part application of U.S. patent application Ser. No. 11/855,131, filed on Sep. 13, 2007. The patent applications identified above are incorporated hereby in their entirety to provide continuity of disclosure.

BACKGROUND OF THE INVENTION

This invention relates to women's garments, undergarments and brassieres, more particularly, a device that attaches to a brassiere and simulates a camisole or tank top and covers a user's chest area and/or cleavage, thereby allowing the user to wear short-cut tops and dresses in formal or any other situations that require a modest attire.

There are many environments, such as work, school, church, etc., where it is considered inappropriate for women to wear low short-cut tops or dresses that reveal too much cleavage. Many women own dresses and/or tops that are formal, but low cut. Therefore a woman can be very limited in her options with regard to clothes for work and so forth. Past attempts have been made to develop garments that attach to brassieres or prevent the low cut tops or dresses to cover exposed cleavage.

However, many of these garments do not attach securely to brassieres to ensure that the garments will not come loose and also do not fit snugly against a woman's chest. A further problem with past garments is that they are not adjustable and thus are not adaptable to different chest sizes and/or different sizes of brassieres. An even further problem with past garments is that some use securing means, such as adhesives, strings, bows, etc., to attach the garments to the brassiere or to the outer garment. These past securing means have been prone to failure due to the fact that securing means, such as adhesives, do not always adhere and do not allow a user to re-use the garment without applying new adhesive. Further, securing means, such as bows, show through the outer garment, thereby making it obvious that a woman is wearing a cleavage covering device that simulates a tank top or camisole. An even further problem with past devices is that they do not attach to strapless brassieres.

Therefore, a need exists for an undergarment that securely attaches to a wearers brassiere, is adjustable to a woman's chest and/or bra size, gives the appearance of being an actual undergarment such as a tank-top, provides a re-usable securing means and can be worn even without a brassiere.

The relevant prior art includes the following references:

| Pat. No. (U.S. unless stated otherwise) | Inventor | Issue/Publication Date |
|---|---|---|
| 2007/0281585 | Calamari et al. | Dec. 6, 2007 |
| 4,955,846 | Greenberg | Sep. 11, 1990 |

SUMMARY OF THE INVENTION

The primary object of the present invention are to provide a garment and brassiere accessory that securely attaches to a wearer's brassiere.

Another object of the present invention is to provide a garment and brassiere accessory that is adjustable to a woman's chest and/or bra size.

An even further object of the present invention is to provide a garment and brassiere accessory that gives the appearance of being an actual undergarment, such as a tank top.

Another object of the present invention is to provide a garment and brassiere accessory that provides a re-usable securing means.

An even further object of the present invention is to provide a garment and brassiere accessory that provides a securing means that is not visible through an outer garment.

Another object of the present invention is to provide a garment and brassiere accessory that fits securely against a woman's chest.

An even further object of the present invention is to provide a garment and brassiere accessory that will attach to a strapless brassiere.

An additional object of the present invention is to provide a garment and brassiere accessory that allows attachment of jewelry to the garment.

An even further object of the present invention is to provide a garment and brassiere accessory that can be instantly taken on or off.

An additional object of the present invention is to provide a garment and brassiere accessory that can be worn without a brassiere.

The present invention fulfills the above and other objects by providing a garment and brassiere accessory that is substantially triangular in shape having a front surface, a rear surface, an upper edge, side edges, upper corners and a lower corner. Attachment straps extend outward from the upper corners. The attachment straps may be looped around the shoulder straps of a brassiere or in the case of a strapless brassiere, around the side straps of the brassiere. The attachment straps have securing means, such as snaps, buttons, hook and loop fastener, etc., located thereon. After looping the attachment straps around the shoulder straps of a brassiere, the securing means located on the attachment straps are secured to a corresponding securing means located along the upper edge of the garment and brassiere accessory. There may be a plurality of securing means located along the upper edge to allow a user to adjust the length of the loops made by the attachment straps and, thus, the width of the garment and brassiere accessory. A securing means is also located on the lower corner of the device. The lower corner may be looped around the center portion of a brassiere. After looping the lower corner around the center portion of a brassiere, the securing means located on the lower corner is secured to a corresponding securing means located on the rear side of the garment and brassiere accessory.

There may be a plurality of securing means located on the rear side of the garment and brassiere accessory to allow a user to adjust the length of the loop made by the lower corner and, thus, the height of the garment and brassiere accessory.

An upper band of elastomeric material is located along the upper edge of the garment and brassiere accessory. The elastomeric material keeps the garment and brassiere accessory securely against a woman's chest while being worn. The garment and brassiere accessory is preferably constructed from two layers of material, an outer layer and an inner layer. An advantage of having multiple layers of material is that the outer layer hides the securing means as well as any wrinkles or indentations caused by the stress of the lower corner pulling on the inner layer while the garment and brassiere accessory is being worn.

Additional features of the present invention include extension straps that attach to the attachment straps and allow a user to adapt the garment and brassiere accessory to a larger chest and/or brassiere size. The extension straps may also be used so that a woman can still wear the garment and brassiere accessory without a brassiere. For example, a long extension strap that goes around the woman's back may be attached to the attachment straps of the garment and brassiere accessory. The garment and brassiere accessory may also include attachment means for attaching jewelry to the garment. The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which:

FIG. 3 is a front view of a garment and brassiere accessory of the present invention attached to a brassiere;

FIG. 4 is a side cross sectional view along line 4-4 of FIG. 3 of a garment and brassiere accessory of the present invention attached to a brassiere;

FIG. 7 is a rear view of an extension strap of the present invention;

DESCRIPTION OF THE PREFERRED EMBODIMENTS

Figure 1:
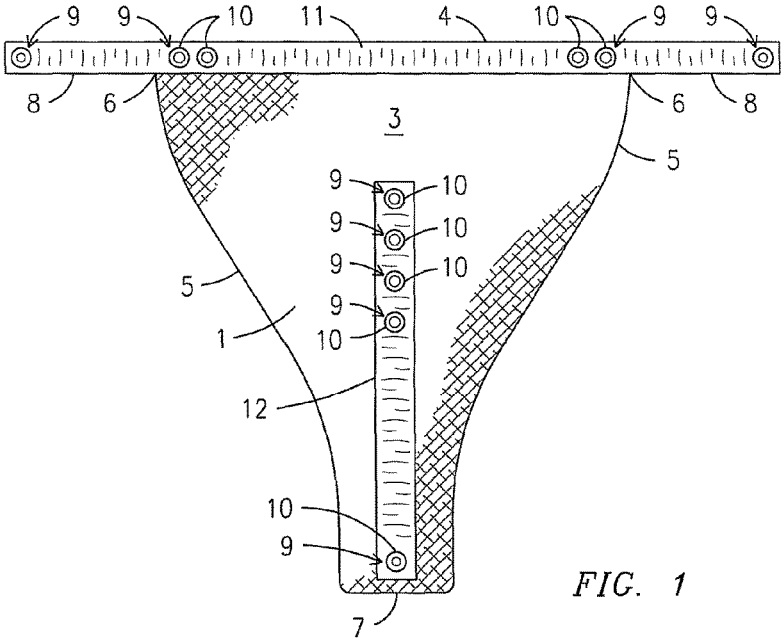
FIG. 1 is a rear view of a garment and brassiere accessory of the present invention.

For purposes of describing the preferred embodiment, the terminology used in reference to the numbered components in the drawings is as follows:

1. body
2. front surface
3. rear surface
4. upper edge
5. side edge
6. upper corner
7. lower corner
8. attachment strap
9. securing means
10. snap
11. upper band
12. lower band
13. brassiere
14. shoulder straps
15. side straps
16. center portion
17. outer layer
18. inner layer
19. indentation
20. extension strap
21. jewelry
22. attachment means
23. bikini top
24. linking means
25. first end
26. second end With reference to FIG. 1, a rear view of a garment and brassiere accessory of the present invention is shown. The garment and brassiere accessory comprises a body 1 that is substantially triangular in shape. The body 1 comprises a front surface 2 (as shown in FIG. 3), a rear surface 3, an upper edge 4, side edges 5, upper corners 6 and a lower corner 7. Attachment straps 8 extend outward from the upper corners 6. A plurality of securing means 9, such as snaps 10, buttons, hook and loop fasteners, hook and eye fasteners, etc., are located along the upper edge 4 of the garment and brassiere accessory and attachment straps 8. Also, a securing means 9 is also located on the lower corner 7 of the garment and brassiere accessory. In addition, a plurality of securing means 9 are located on the rear surface 3 of the garment and brassiere accessory directly above the lower corner 7. An upper band 11 preferably having elastomeric qualities is located along the upper edge 4 of the garment and brassiere accessory. The upper band 11 keeps the garment and brassiere accessory securely against a woman's chest while being worn. A lower band 12 preferably having elastomeric qualities is located on the rear surface 3 of the garment and brassiere accessory and provides reinforcement for the securing means 9 that are located on the rear surface 3 of the garment and brassiere accessory directly above the lower corner 7.

Figure 2:
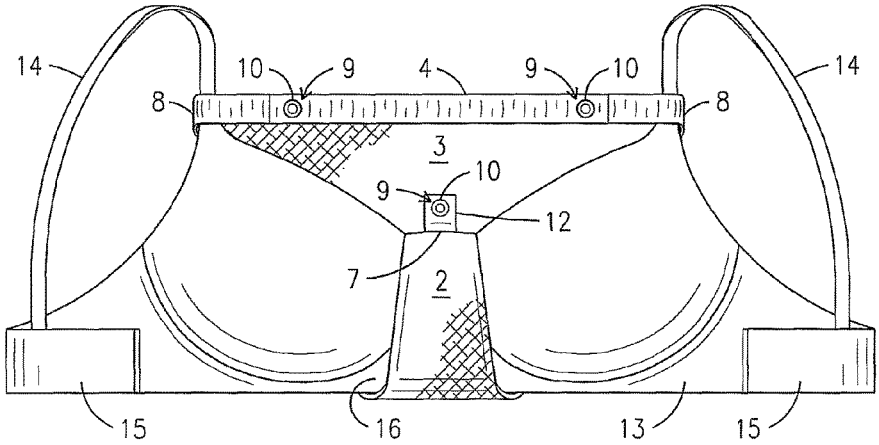
FIG. 2 is a rear view of a garment and brassiere accessory of the present invention attached to a brassiere.

With reference to FIGS. 2 and 3, a rear view and a front view of a garment and brassiere accessory of the present invention attached to a brassiere 13, respectively, are shown. To secure the garment and brassiere accessory to a brassiere 13, the attachment straps 8 are looped around shoulder straps 14 of the brassiere 13 or in the case of a strapless brassiere, looped around or looped under and over side straps 15 of the brassiere 13. The attachment straps 8 are then secured to the upper edge 4 of the garment and brassiere accessory by attaching the securing means 9 located on the attachment straps 8, which as shown here are snaps 10, to corresponding securing means 9 located along the upper edge 4 of the garment and brassiere accessory. Then the lower corner 7 is looped around a center portion 16 of the brassiere 13. The lower corner 7 is then secured to the rear surface 3 of the garment and brassiere accessory by attaching the securing means 9 located on the lower corner 7 to corresponding securing means 9 located along the rear surface 3 of the garment and brassiere accessory.

With reference to FIG. 4, a side cross sectional view along line 4-4 of FIG. 3 of a garment and brassiere accessory of the present invention attached to a brassiere 13 is shown. The garment and brassiere accessory is preferably constructed from two layers of material, an outer layer 17 and an inner layer 18, both preferably made of a stretchable cloth-like material. An advantage of having an outer layer 17 and an inner layer 18 is that the outer layer 17 hides the securing means 9 as well as any wrinkles or indentations 19 caused by the stress of the lower corner 7 pulling downward on the inner layer 17 while the garment and brassiere accessory is being worn.

Figure 5:
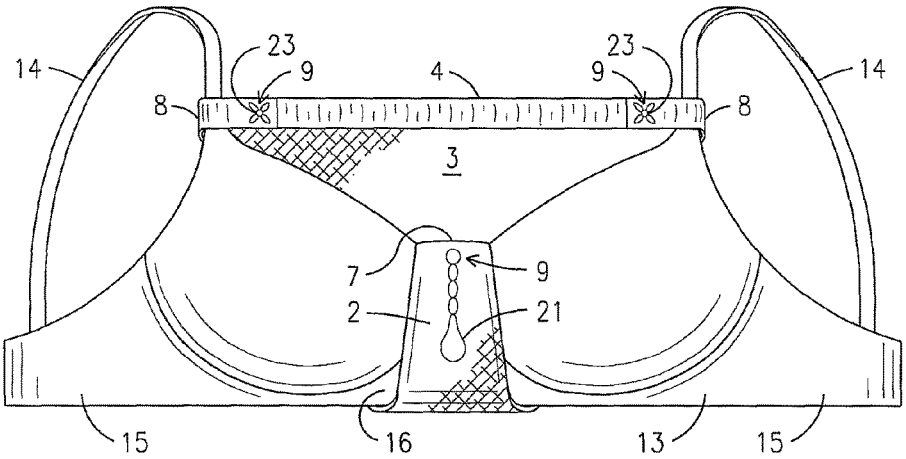
FIG. 5 is a front view of a garment and brassiere accessory of the present invention attached to a bikini top.

With reference to FIG. 5, a front view of a garment and brassiere accessory of the present invention attached to a bikini top 23 is shown. The garment and brassiere accessory is worn with the rear surface 3 facing outward when worn on a bikini top 23. To secure the garment and brassiere accessory to the bikini top 23, the attachment straps 8 are looped around shoulder straps 14 of the bikini top 23. The attachment straps 8 are then secured to the upper edge 4 of the garment and brassiere accessory by attaching the securing means 9 located on the attachment straps 8, which as shown here are decorative snaps 23, to corresponding securing means 9 located along the upper edge 4 of the garment and brassiere accessory. Then the lower corner 7 is looped around a center portion 16 of the bikini top 23. The lower corner 7 is then secured to the rear surface 3 of the garment and brassiere accessory by attaching the securing means 9 located on the lower corner 7 to corresponding securing means 9 located along the rear surface 3 of the garment and brassiere accessory. A decorative piece of jewelry 21 is attached to the securing means 9 located on the lower corner 7.

Figure 6:
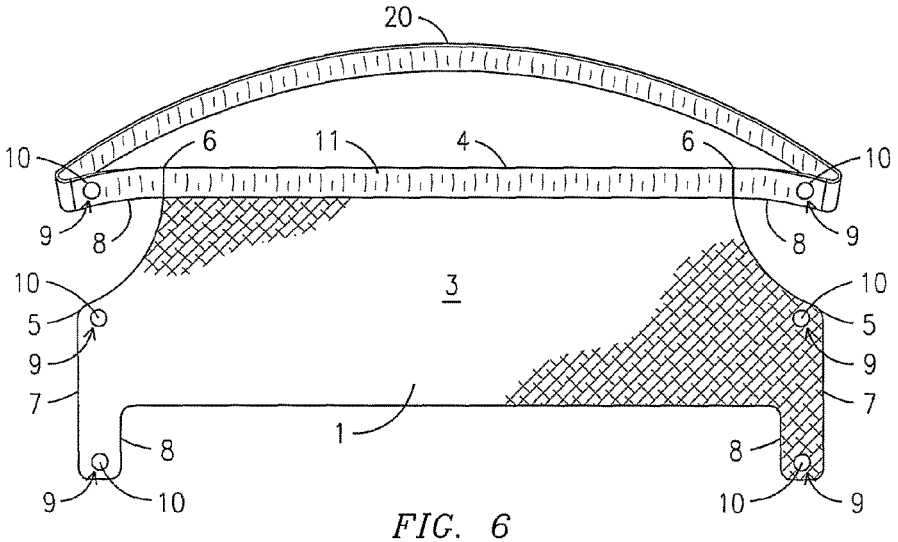
FIG. 6 is a front view of a garment and brassiere accessory of the present invention for use with strapless brassieres.

With reference to FIG. 6, a front view of a garment and brassiere accessory of the present invention for use with strapless brassieres. The garment and brassiere accessory comprises a body 1 that is substantially rectangular in shape. The body 1 comprises a front surface 2, a rear surface 3, an upper edge 4, side edges 5, upper comers 6 and lower corners 7. Attachment straps 8 extend outward from the upper corners 6. Securing means 9, such as snaps 10, buttons, hook and loop fasteners, hook and eye fasteners, etc., are located on the attachment straps 8. The attachment straps 8 are used in conjunction with an extension strap 20 (as shown further in FIG. 7) that allows a user to secure the upper edge 4 of the garment and brassiere accessory around the user's back. Also, attachment straps 8 having securing means 9 extend downward from the lower corners 7 of the garment and brassiere accessory. In addition, securing means 9 are located on the rear surface 3 of the garment directly above the lower corners 7. The attachment straps 8 located on the lower corners 7 may be looped baround or looped under and over side straps 15 of the brassiere 13. An upper band 11 preferably having elastomeric qualities is located along the upper edge 4 of the garment and brassiere accessory. The upper band 11 keeps the garment and brassiere accessory securely against a woman's chest while being worn.

With reference to FIG. 7, a rear view of an extension strap 20 of the present invention 20 is shown. The extension strap 20 can be made in various lengths or sizes. The extension strap 20 has securing means 9 located on opposite ends that attach to the securing means 9 located on the garment and brassiere accessory allow a user to adapt the garment and brassiere accessory to a larger chest and/or brassiere 13 size. Extension straps 20 may also be used so that a woman can still wear the garment and brassiere accessory without a brassiere 13. For example, a long extension strap 20 may be attached to the attachment straps 8 of the garment and brassiere accessory and be worn around the back of a user.

Figure 8:
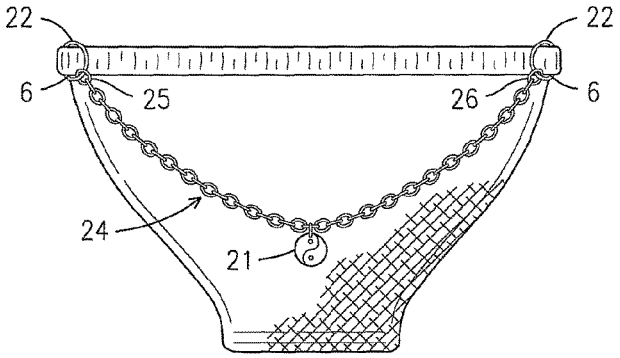
FIG. 8 is a front view of a garment and brassiere accessory of the present invention having jewelry attached thereto.

With reference to FIG. 8, a front view of a garment and brassiere accessory of the present invention having jewelry 21 attached thereto is shown. The garment and brassiere accessory may have an attachment means 22, such as loops, hooks, clasps, etc., that allow a 10 user to attach a piece of jewelry 21 or a plurality of linking means 24, such as a rope, ribbon, wire, chain, pearls, beads, etc., having a first end 25 and a second end 26, to the garment and brassiere accessory or directly to a brassiere. The attachment means 22 are preferably located near the upper corners 6 of the garment and brassiere accessory.

Figure 9:
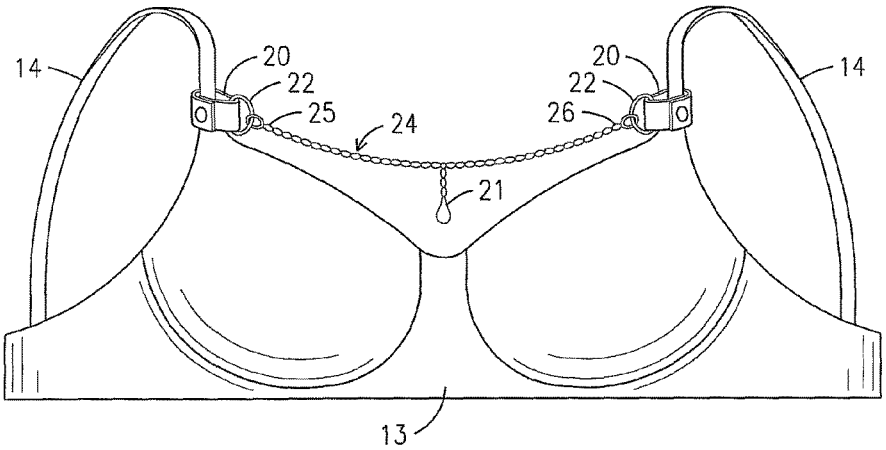
FIG. 9 is a front view of a brassiere having jewelry attached thereto via extension straps of the present invention.

Finally with reference to FIG. 9, a front view of a brassiere 13 having jewelry 21 attached thereto via extension straps 20 of the present invention is shown. Jewelry 21 or a plurality of linking means 24, such as a rope, ribbon, wire, chain, pearls, beads, etc., having a first end 25 and a second end 26, is attached to the brassiere 13 by looping the extension straps 20 around the shoulder straps 14 of the brassiere 13 and through the an attachment means 22, which as shown here are rings.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not be considered limited to what is shown and described in the specification and drawings.

What is claimed is:

1. A brassiere garment accessory comprising:

a body having a front surface, a rear surface, an upper edge, at least two side edges, and at least two upper corners at distal ends of the upper edge and at least one lower corner *configured to be proximate to a center portion of the brassiere when in use*; at least one attachment strap extending from each of the at least two upper corners, the at least one attachment strap having a proximal portion coupled to the body and a distal portion extending away from the body along the upper edge; [and] at least one fastener located on the distal portion of the at least one attachment strap that facilitates coupling of the at least one fastener located on the distal portion of the at least one attachment strap to at least one [fastener] *of a plurality of fasteners* located on at least one of the proximal portion of the at least one attachment strap and the body of the brassiere garment*; and an attachment portion for attaching a piece of jewelry to the brassiere garment* accessory.

2. A brassiere garment accessory of claim 1 further comprising: an upper band located along the upper edge of the body.

3. A brassiere garment accessory of claim 2 wherein: said upper band has elastomeric qualities.

4. A brassiere garment accessory of claim 1 further comprising: a lower band located on the rear surface of the body.

5. A brassiere garment accessory of claim [2] *4* wherein: said lower band has elastomeric qualities.

6. A brassiere garment accessory of claim 1 wherein: the body further comprises at least one outer layer and at least one inner layer.

7. A brassiere garment accessory of claim 1 further comprising: an extension strap for extending the length of the at least one attachment strap.

[8. A brassiere garment accessory of claim 1 further comprising: an attachment portion for attaching a piece of jewelry to the garment and brassiere accessory.]

[9. A brassiere garment accessory of claim 1 wherein: the body further comprises at least one lower corner.]

10. A brassiere garment accessory of claim [9] *1* further comprising: at least one fastener located on the at least one lower corner.

11. A brassiere garment accessory comprising: a body having a front surface, a rear surface, an upper edge, at least two side edges, [and] at least two upper corners at distal ends of the upper edge*, and at least one lower corner configured to be proximate to a center portion of the brassiere when in use*; at least one attachment strap extending from each of the at least two upper corners, the attachment strap having a proximal portion coupled to the body and a distal portion extending away from the body along the upper edge; [and] at least one fastener located on the distal portion of the attachment strap that facilitates coupling of the at least one fastener located on the distal portion of the at least one attachment strap to at least one fastener located on at least one of the proximal portion of the at least one attachment strap and the body of the brassiere garment accessory; wherein at least a portion of the body comprises at least one inner layer and at least one outer layer; and the upper edge has elastomeric qualities*; and an attachment portion for attaching a piece of jewelry to the brassiere garment accessory*.

12. A brassiere garment accessory of claim 11 further comprising: an upper band located along the upper edge of the body.

13. A brassiere garment accessory of claim 12 wherein: said upper band has elastomeric qualities.

14. A brassiere garment accessory of claim 11 further comprising: a lower band located on the rear surface of the body.

15. A brassiere garment accessory of claim 14 wherein: said lower band has elastomeric qualities.

16. A brassiere garment accessory of claim 11 further comprising: an extension strap for extending the length of the at least one attachment strap.

[17. A brassiere garment accessory of claim 11 further comprising: an attachment portion for attaching a piece of jewelry to the garment and brassiere accessory.]

18. A brassiere garment accessory comprising: a body having a front surface, a rear surface, an upper edge, at least two side edges, and at least two upper corners at distal ends of the upper edge and at least one lower corner [and] *configured to be proximate to a center portion of the brassiere when in use*; at least one attachment strap extending from each of the at least two side edges, the attachment strap having a proximal portion coupled to the body and a distal portion extending away from the body [along] *proximate to* the upper edge the at least one attachment strap further having at least one fastener located on a distal portion of the at least one attachment strap that facilitates coupling of the at least one fastener located on the distal portion of the at least one attachment strap to at least one [fastener] *of a plurality of fasteners* located on at least one of a proximal portion of the at least one attachment strap and the body of the brassiere garment accessory*; and an attachment portion for attaching a piece of jewelry to the brassiere garment accessory*.

19. A brassiere garment accessory of claim 18, wherein at least a portion of the body comprises at least one inner layer and at least one outer layer.

[20. A brassiere garment accessory of claim 18, further comprising a plurality of fasteners located on the proximal portion of the attachment strap and at least one fastener located on the distal portion of the attachment strap.]

*21. A brassiere garment accessory of claim 18 further comprising: an upper band located along the upper edge of the body.*

* * * * *